Figure 1:
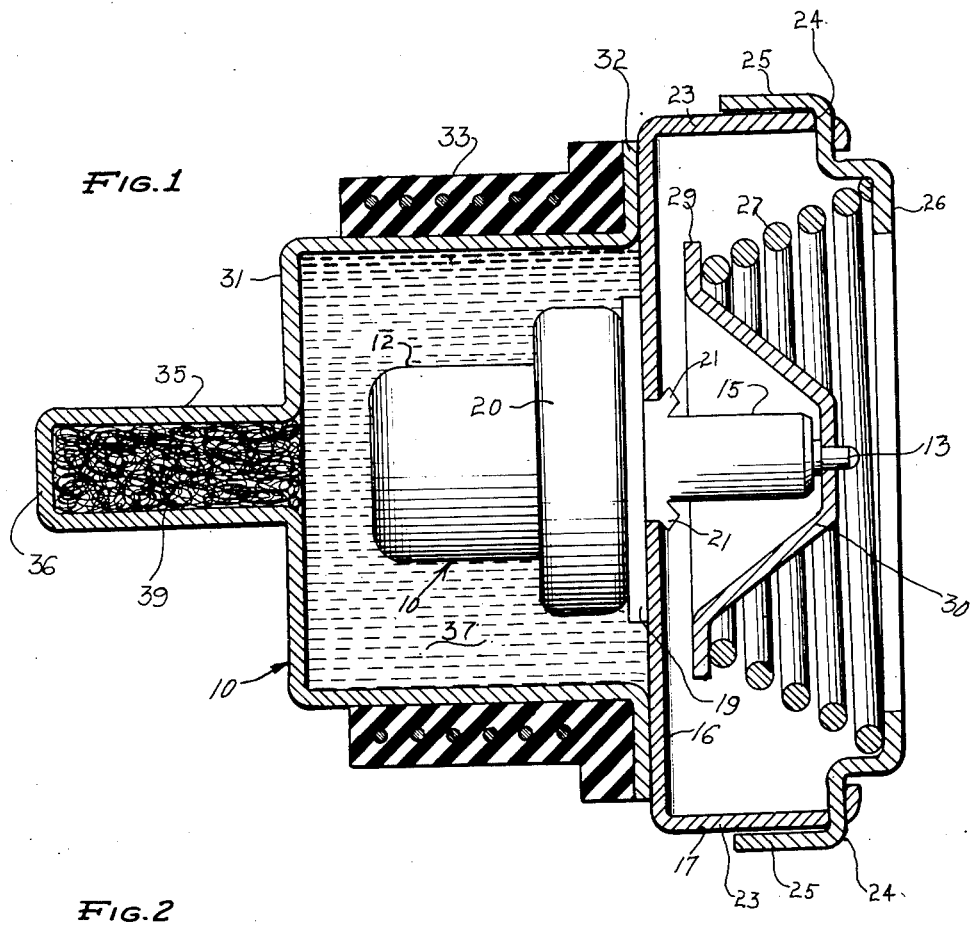

April 3, 1962     C. C. BAUERLEIN     3,027,730

THERMALLY RESPONSIVE ACTUATOR

Filed April 17, 1959

Inventor
Carl C. Bauerlein
by Hill, Sherman, Meroni, Gross & Simpson Attys.

United States Patent Office 3,027,730
Patented Apr. 3, 1962

3,027,730
THERMALLY RESPONSIVE ACTUATOR
Carl C. Bauerlein, Lincolnwood, Ill., assignor to The Dole Valve Company, Morton Grove, Ill., a corporation of Illinois
Filed Apr. 17, 1959, Ser. No. 807,067
4 Claims. (Cl. 62—135)

This invention relates to improvements in thermally responsive actuators and more particularly relates to improvements in thermally responsive actuators in which the actuator operates parallel to the freezing of water, and frequently called an analog thermostat.

Thermostats have heretofore been provided in which the temperature of freezing water is estimated by measuring the temperature of another liquid experiencing a similar variation of temperature with time as the freezing water, the temperature of which is estimated.

Such thermostats usually contain the liquid whose temperature is measured in a chamber, which is an integral part of the thermostat assembly, with the liquid in heat sensing relation with respect to the thermally responsive element and measure the temperature of freezing water and are used to initiate a cycle, such as a cycle of removing frozen ice pieces from an ice tray and must initiate the ice removing cycle shortly after the freezing of ice pieces in the ice tray has been completed.

It has further been found that with a thermostat measuring the temperature of a liquid contained in a chamber which is an integral part of the thermostat assembly and estimating the temperature of freezing ice pieces, that during freezing of the liquid in the casing and shortly before the liquid is frozen, the temperature of the liquid will drop in the range of from approximately 22° F. to 26° F. The liquid will then warm up to 32° and freeze. This drop in temperature prior to freezing is commonly called undercooling or supercooling and where the liquid in the chamber is estimating the temperature of freezing water, such as ice pieces in an ice tray, during the period of supercooling, the thermostat will come into operation and instigate an ice removing cycle prior to the freezing of water in the ice tray.

It has been found that the change of state from a liquid to a solid is propagated by supplying the liquid with seed crystals and that when the liquid is supplied with seed crystals, the liquid will freeze with little, if any, undercooling. This propagation of freezing by supplying the liquid with ice crystals in a physical chemical phenomenon and has previously been known and when applied to a thermostat in which the temperature sensing element is contained in a casing filled with freezable liquid, causes the thermostat to operate in parallel to the freezing of water and prevents operation of the thermostat prior to the freezing of water.

While thermostats in which freezing of the sensing liquid is propagated by seeding the liquid with ice crystals have operated very satisfactorily, it has been found that improved results may be attained by providing a member of low heat conductivity in communication with the liquid and by using a wick, to provide fluid communication between the member of low heat conductivity and the body of sensing liquid, and maintain ice crystals in communication with the sensing liquid.

A principal object of the invention is, therefore, to provide an improved form of thermally responsive actuator in which a body whose temperature is measured is self-contained as an integral part of the thermostat assembly, in which wicking in a region of low heat conductivity maintains ice crystals in communication with the body being sensed during melting thereof and seeds the body with ice crystals during freezing thereof.

A further object of the invention is to provide a thermally responsive actuator in which a freezable liquid surrounds the temperature sensitive element of the actuator, in which supercooling of the freezable liquid is inhibited by containing a part of the liquid whose temperature is being measured in a tube of low heat conductivity and by providing a cotton wicking in this tube to maintain ice crystals therein in communication with the liquid being sensed.

Figure 2:
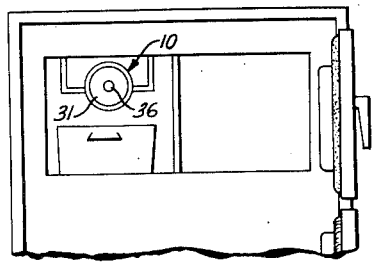

These and other objects of the invention will appear from time to time as the following specification proceeds and with reference to the accompanying drawings wherein:

FIGURE 1 is a longitudinal sectional view taken through a thermally responsive actuator constructed in accordance with the invention; and FIGURE 2 is a diagrammatic view showing the actuator in the freezing compartment of a refrigerator.

In the embodiment of the invention illustrated in the drawing, I have shown a thermally responsive actuator 10 of a type particularly adapted to control the carrying out of the ice making and ice removing cycles of an automatic ice maker and the like. The thermally responsive actuator 10 is shown as including a thermally responsive element 11, herein shown as being of a type similar to that shown and described in Patent No. 2,368,181, which issued to Sergius Vernet on January 30, 1945, and of the so-called power or high motion solid fill type of thermally responsive element. In such thermally responsive elements, a fusible thermally expansible material within a casing 12, acts against a flexible membrane or diaphragm (not shown) to extensibly move a power member or piston 13 from a cylinder 15 of the thermally responsive element, upon fusion of the thermally expansible material contained within the casing 12.

The thermally expansible material may be a silicone material or may be a wax, or a wax and a powdered metal heat conductor and a binder, the particular material used being selected for the desired temperature range of operation of the thermally responsive element, and the required sensitiveness to changes in temperature.

The thermally responsive element 11 is herein shown as being mounted in a bottom wall 16 of a cage 17. A washer 19 is interposed between a clamping ring 20, clamping the casing 12 to the cylinder 15, and the bottom 16 of the cage 17. The cylinder 15 extends through the bottom 16 of the cage 17 and is shown as being staked thereto as indicated by reference character 21.

The cage 17 has parallel upright arms 23 having slots 24 therein, through which fit tangs 25 of an annular spring retainer 26. The tangs 25 are shown as being bent about the outer margins of the arms 23 and extend in generally parallel relation with respect thereto, to lock the spring retainer 26 to the cage 17.

The spring retainer 26 forms a seat for a return spring 27 for the power member or piston 13 of the thermally responsive element. The return spring 27 is shown as being a conical spring, seated at one end in the retainer 26 and seated at its opposite end on a flange 29 of a saddle 30, mounted on the power member or piston 13 and extending angularly outwardly and inwardly therefrom towards the bottom 16 of the cage 17.

The casing 12 of the thermally responsive element 11 is enclosed by a generally cylindrical container 31, spaced from said casing in radial and axial directions, and having an annular flange 32, extending laterally from the inner margin of said container and abutting the bottom 16 of the cage 17, and suitably secured thereto in water tight relation with respect thereto.

The container 31 is encircled by a resistor heater 33, abutting the underside of the flange 32 at one end and extending along said container to a position closely adjacent the outer end thereof. The resistor heater 33 may be of any well known form and serves to reset the thermostat, by heating the thermally responsive element to effect extensible movement of the power member or piston 13. The power member 13 thus serves as the actuator for the thermostat and resets the thermostat upon increases in temperature effected by heating the thermally expansible material by the resistor heater 33 and effects a control operation, such as, the discharge of ice pieces from an ice tray upon freezing of the freezable liquid in the container 31.

The container 31 may be made from a material of low heat conductivity, such as stainless steel or any other suitable material of low heat conductivity, and is shown in the drawings as having a tube 35 formed integrally therewith and extending therefrom, and having a closed outer end portion 36. The tube 35 may be pressed from the bottom of the container 31, although it should be understood that it need not be formed integrally with the bottom of the container, but may be a separate tube made from any suitable material of low heat conductivity.

The space between the casing 12 and clamping ring 20 of the thermal element 11 and the inside of the casing 31, with the bottom 16 of the cage 17 forms an annular chamber 37, which with the tube 35 is filled with water or a like freezable material, or a mixture of water with one of the known chemicals, giving the water properties having similar variations of temperature with time as the body, the temperature of which is to be estimated. The tube 35 contains a wick 39 therein. The tube of low heat conductivity and wick 39 therein, may be subject to the ambient temperature in the evaporator compartment of a refrigerator or the like, or may be in heat sensing relation with respect to a body, the temperature of which is estimated.

The wick 39 in the tube of low heat conductivity will thus maintain ice crystals in said tube in communication with the liquid in the chamber 37 upon melting of said liquid, and will seed the liquid in the chamber 37 with ice crystals as the liquid therein freezes. This will prevent supercooling of the liquid in the chamber 37, and will therefore prevent retractible movement of the piston 13 sufficiently to effect premature operation of a device to be controlled, prior to the freezing of water, where the actuator may be used to control a freezing operation or operation of an ice maker or the like.

The tube 35 of low heat conductivity thus retains ice crystals in the wick 39 as the liquid in the chamber 37 is melted by energization of the resistor heater 33, and maintains continuity with the liquid in the chamber 37 regardless of the position of said chamber. The ice crystals in said tube and in the wick 39 will thus seed the liquid in the chamber 37, and inhibit supercooling of the liquid in said chamber during freezing thereof.

It may be seen from the foregoing that the accuracy and effectiveness of the thermally responsive actuator is enhanced by estimating the temperature of a body, such as water and the like, by measuring the temperature of a body of water or like liquid, which is an integral part of the thermostat assembly, and that the supercooling of the body of water measured is inhibited by maintaining a region of low heat conductivity in communication with the body of water and by assuring continuity with the body of water with ice crystals by a wick in a region of low heat conductivity, retaining ice crystals in the region of low heat conductivity, as the body of water melts.

While I have herein shown and described one form in which my invention may be embodied, it will be understood that various modifications and variations in the invention may be effected without departing from the spirit and scope of the novel concepts of the invention, as defined by the claims appended hereto.

I claim as my invention:

1. In an actuator adapted for use in the evaporator compartment of a refrigerator and responsive to the freezing of water in the evaporator compartment into ice, a casing remote from the freezing water and containing a thermally expansible material, a chamber enclosing said casing, a freezable liquid within said chamber having change of state characteristics similar to the water freezing into ice, an actuator member extensibly and retractibly movable with respect to said casing upon changes in temperature, means retractibly moving said actuator member upon decreases in temperature, and means preventing operation of said actuator member prior to the freezing of water in said evaporator into ice, comprising a wick in fluid communication with the freezable liquid within said chamber and storing ice crystals upon melting of the liquid within said chamber for seeding the freezable liquid within said chamber with ice crystals and controlling retractible movement of said actuator in parallel with the freezing of water.

2. In a thermally responsive actuator adapted for use in the evaporator compartment of a refrigerator and responsive to the freezing of water in the evaporator compartment into ice, a casing remote from the freezing water and containing a thermally expansible material, an actuator member extensibly and retractibly movable with respect to said casing, means heating said casing to effect extensible movement of said actuator member, means retractibly moving said actuator member upon cooling of the thermally expansible material, a chamber surrounding said casing and containing a freezable liquid having change of state characteristics similar to the water being frozen into ice, and means propagating the freezing of liquid in said chamber and preventing retractible movement of said actuator prior to the freezing of water in the evaporator into ice, comprising a wick in fluid communication with the liquid in said casing and retaining ice crystals upon heating of said casing and seeding liquid in said chamber with ice crystals upon reductions in temperature of said liquid to freezing temperatures.

3. In an actuator adapted for use in the evaporator compartment of a refrigerator and responsive to the freezing of water in the evaporator compartment into ice, a casing remote from the freezing water and containing a thermally expansible material, a chamber surrounding said casing, a freezable liquid contained within said chamber, the temperature of which is sensed by the thermally expansible material within said casing to estimate the temperature of water in the evaporator, an actuator member extensibly and retractibly movable with respect to said casing in accordance with changes in temperature, and means propagating the freezing of liquid within said chamber and preventing operation of said actuator member prior to the freezing of water in the evaporator into ice comprising a tube of low heat conductivity having fluid communication with said chamber and a wick within said tube maintaining ice crystals in said tube as the temperature of the freezable liquid within said chamber is raised to effect a resetting operation and propagating freezing of the freezable liquid within said chamber by seeding the liquid with ice crystals during reduction in temperature of the freezable liquid within said chamber to freezing temperatures.

4. In an actuator adapted for use in the evaporator compartment of a refrigerator and responsive to the freezing of water in the evaporator compartment into ice, a casing remote from the freezing water and containing a thermally expansible material, an actuator member extensibly and retractibly movable with respect to said casing, a container extending about said casing and containing a freezable liquid, the temperature of which is sensed by the thermally expansible material within said casing to estimate the state of the freezing water, a resistor heater extending about said chamber and energizable to heat the freezable liquid in said chamber and effect extensible movement of said actuator member, and means propagating the freezing of the liquid within said chamber upon deenergization of said resistor heater comprising a tube of low heat conductivity having communication with said chamber and the freezable liquid therein, and a wick within said tube maintaining communication between said tube and the liquid within said chamber and storing ice crystals in said tube and seeding the freezable liquid within said chamber with ice crystals by contact therewith during reduction of the temperature of the freezable liquid to freezing temperatures.

References Cited in the file of this patent

UNITED STATES PATENTS

| | | |
|---|---|---|
| 2,115,501 | Vernet | Apr. 26, 1938 |
| 2,115,502 | Vernet | Apr. 26, 1938 |
| 2,453,851 | Miller | Nov. 16, 1948 |
| 2,561,437 | Cobb | July 24, 1951 |
| 2,622,923 | Cobb | Dec. 23, 1952 |
| 2,970,453 | Harle | Feb. 7, 1961 |
| 2,973,630 | Krieckbaum | Mar. 7, 1961 |
| 2,975,610 | Olson | Mar. 21, 1961 |